US012583108B2

(12) United States Patent
Power et al.

(10) Patent No.: US 12,583,108 B2
(45) Date of Patent: Mar. 24, 2026

(54) GRASP SELECTION

(71) Applicant: Honda Motor Co., Ltd., Tokyo (JP)

(72) Inventors: Thomas Power, Ann Arbor, MI (US);
Rana Soltani Zarrin, Los Gatos, CA
(US)

(73) Assignee: Honda Motor Co., Ltd., Tokyo (JP)

( * ) Notice: Subject to any disclaimer, the term of this
patent is extended or adjusted under 35
U.S.C. 154(b) by 570 days.

(21) Appl. No.: 18/080,623

(22) Filed: Dec. 13, 2022

(65) Prior Publication Data

US 2024/0083021 A1     Mar. 14, 2024

Related U.S. Application Data

(60) Provisional application No. 63/401,488, filed on Aug.
26, 2022.

(51) Int. Cl.
B25J 9/16          (2006.01)

(52) U.S. Cl.
CPC ........... B25J 9/1664 (2013.01); B25J 9/1612
(2013.01); B25J 9/1689 (2013.01); G05B
2219/39001 (2013.01); G05B 2219/39511
(2013.01); G05B 2219/40465 (2013.01)

(58) Field of Classification Search
CPC ...... B25J 9/1664; B25J 9/1612; B25J 9/1689;
G05B 2219/39001; G05B 2219/39511;
G05B 2219/40465
See application file for complete search history.

(56) References Cited

U.S. PATENT DOCUMENTS

| | | | | |
|---|---|---|---|---|
| 9,975,242 | B1 * | 5/2018 | Stubbs | B25J 9/1612 |
| 11,173,602 | B2 * | 11/2021 | Odhner | B25J 15/0009 |
| 2019/0321974 | A1 * | 10/2019 | Leon | B25J 9/1687 |
| 2020/0039073 | A1 | 2/2020 | Diankov | |
| 2021/0154832 | A1 | 5/2021 | Truebenbach et al. | |
| 2021/0299866 | A1 | 9/2021 | Felip Leon et al. | |
| 2022/0016778 | A1 * | 1/2022 | Sinyavskiy | G01C 21/3453 |
| 2023/0081119 | A1 * | 3/2023 | Rohanimanesh | B25J 9/1653 |
| | | | | 700/250 |
| 2023/0166398 | A1 * | 6/2023 | Fan | B25J 9/1653 |
| | | | | 700/255 |
| 2023/0241771 | A1 * | 8/2023 | Sriraman | G05B 19/4155 |
| | | | | 700/246 |
| 2023/0294277 | A1 | 9/2023 | Yang et al. | |
| 2024/0123620 | A1 * | 4/2024 | Tremblay | B25J 9/161 |

(Continued)

OTHER PUBLICATIONS

Office Action of U.S. Appl. No. 18/090,966 dated Jan. 13, 2025, 19
pages.

(Continued)

*Primary Examiner* — Jason Holloway
*Assistant Examiner* — Madison B Emmett
(74) *Attorney, Agent, or Firm* — Rankin, Hill & Clark
LLP

(57)          ABSTRACT

Systems and techniques for grasp selection may include
receiving one or more candidate object trajectories and a
current grasp of a robotic hand on an object, sampling
random candidate grasps for the one or more candidate
object trajectories based on the current grasp, generating one
or more grasps to be optimized for each of the one or more
candidate object trajectories based on the sampled candidate
grasps, and optimizing one or more of the grasps to be
optimized for each of the one or more candidate object
trajectories based on a cost function.

20 Claims, 5 Drawing Sheets

300

Receiving candidate object trajectories and
current grasp of robotic hand on object — 302

Sampling random candidate grasps for candidate
object trajectories based on current grasp — 304

Generating grasps to be optimized for each of
the candidate object trajectories based on
sampled candidate grasps — 306

Optimizing of grasps to be optimized for each of
the candidate object trajectories based on cost
function — 308

(56) References Cited

U.S. PATENT DOCUMENTS

| | | | |
|---|---|---|---|
| 2024/0139946 A1 | 5/2024 | Kojima et al. | |
| 2024/0272615 A1* | 8/2024 | Benosman | G05B 13/0235 |
| 2024/0375274 A1* | 11/2024 | Merz, Jr. | B25J 9/1664 |

OTHER PUBLICATIONS

A. Agrawal, B. Amos, S. Barratt, S. Boyd, S. Diamond, and Z. Kolter, "Differentiable convex optimization layers," in Advances in Neural Information Processing Systems, 2019.

B. Amos and J. Z. Kolter, "OptNet: Differentiable optimization as a layer in neural networks," in Proceedings of the 34th International Conference on Machine Learning, ser. Proceedings of Machine Learning Research, vol. 70. PMLR, 2017, pp. 136-145.

Y. Du and I. Mordatch, "Implicit generation and modeling with energy based models," in Advances in Neural Information Processing Systems, H. Wallach, H. Larochelle, A. Beygelzimer, F. d'Alche-Buc, E. Fox, and R. Garnett, Eds., vol. 32. Curran Associates, Inc., 2019. [Online]. Available: https://proceedings.neurips.cc/paper/2019/file/378a063b8fdb1db941e34f4bde584c7d-Paper.pdf.

E. K. Gordon and R. S. Zarrin, "Online augmentation of learned grasping for more general in-hand tool manipulation," 2022.

M. Kalakrishnan, S. Chitta, E. Theodorou, P. Pastor, and S. Schaal, "Stomp: Stochastic trajectory optimization for motion planning," in 2011 IEEE International Conference on Robotics and Automation, 2011, pp. 4569-4574.

A. Lambert, A. T. Le, J. Urain, G. Chalvatzaki, B. Boots, and J. Peters, "Learning implicit priors for motion optimization," in 2022 International Conference on Intelligent Robots and Systems (IROS), 2022.

J. Ortiz, A. Clegg, J. Dong, E. Sucar, D. Novotny, M. Zollhoefer, and M. Mukadam, "isdf: Real-time neural signed distance fields for robot perception," in Robotics: Science and Systems, 2022.

J. J. Park, P. Florence, J. Straub, R. Newcombe, and S. Lovegrove, "Deepsdf: Learning continuous signed distance functions for shape representation," in The IEEE Conference on Computer Vision and Pattern Recognition (CVPR), Jun. 2019.

R. S. Zarrin and K. Yamane, "Hybrid model and learning-based planning and control of in-hand manipulation," 2020.

Notice of Allowance of U.S. Appl. No. 18/090,966 dated Apr. 24, 2025, 14 pages.

* cited by examiner

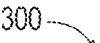

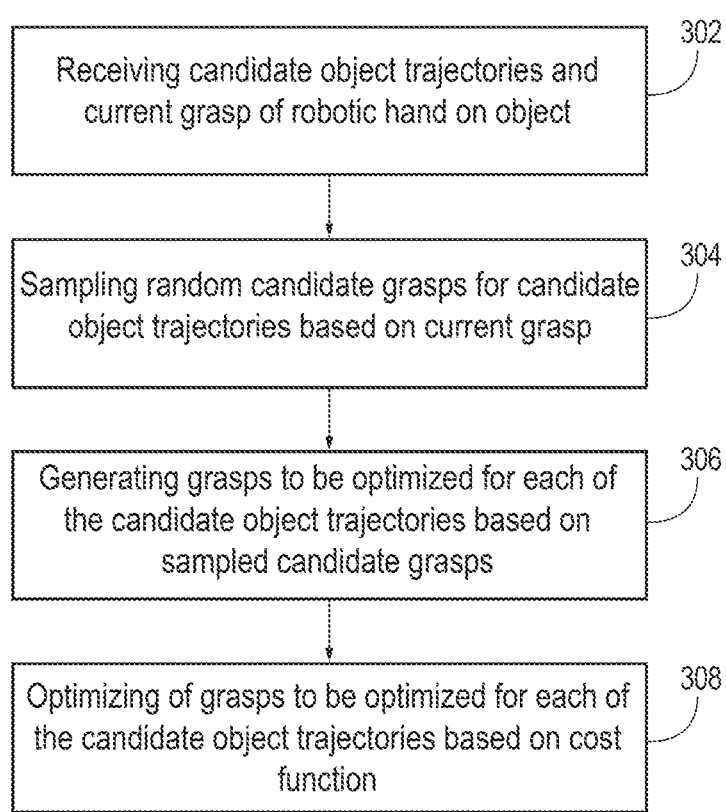

300

302
Receiving candidate object trajectories and current grasp of robotic hand on object 304
Sampling random candidate grasps for candidate object trajectories based on current grasp 306
Generating grasps to be optimized for each of the candidate object trajectories based on sampled candidate grasps 308
Optimizing of grasps to be optimized for each of the candidate object trajectories based on cost function

COMPUTER
INSTRUCTIONS

406

01011010001010
10101011010101
101101011100...

408

COMPUTER READABLE
MEDIUM

GRASP SELECTION

CROSS-REFERENCE TO RELATED APPLICATIONS

This application claims the benefit of U.S. Provisional Patent Application, Ser. No. 63/401,488 entitled "COMBINING SAMPLE-BASED AND GRADIENT-BASED TRAJECTORY OPTIMIZATION FOR DEXTEROUS MANIPULATION WITH LEARNED COST MODELS", filed on Aug. 26, 2022; the entirety of the above-noted application(s) is incorporated by reference herein.

BACKGROUND

Dexterous in-hand manipulation may be a challenging robotics task which involves re-orientating an object from an initial pose to a goal pose while grasping the object. Re-orientating an object in-hand may be necessary when a task requires a certain object pose or grasp that is different from the initial grasped pose.

BRIEF DESCRIPTION

According to one aspect, a system for grasp selection may include a memory and a processor. The memory may store one or more instructions. The processor may execute one or more of the instructions stored on the memory to perform one or more acts, actions, steps, etc., such as receiving one or more candidate object trajectories and a current grasp of a robotic hand on an object, sampling random candidate grasps for the one or more candidate object trajectories based on the current grasp, generating one or more grasps to be optimized for each of the one or more candidate object trajectories based on the sampled candidate grasps, and optimizing one or more of the grasps to be optimized for each of the one or more candidate object trajectories based on a cost function.

The processor may select an optimized grasp from among the one or more grasps to be optimized associated with each of the one or more candidate object trajectories. Each one of the one or more candidate object trajectories may include two or more waypoints. The processor may generate one or more of the grasps to be optimized for each waypoint of each candidate object trajectory based on the sampled candidate grasps.

The cost function may include a term for evaluating stability of one or more of the grasps to be optimized. The cost function may include a term for mitigating collisions between two or more fingers of the robotic hand and the object. The cost function may include a term indicative of a signed distance field (SDF) of the object. The SDF of the object may be minimized at zero when contact points of two or more fingers of the robotic hand may be on a surface of the object. The cost function may include an energy based model. The cost function may include a wrench cost, a collision cost, or an inverse kinematics cost.

According to one aspect, a system for grasp selection may include a memory and a processor. The memory may store one or more instructions. The processor may execute one or more of the instructions stored on the memory to perform one or more acts, actions, steps, etc., such as receiving one or more candidate object trajectories and a current grasp of a robotic hand on an object, wherein each one of the one or more candidate object trajectories may include two or more waypoints, sampling random candidate grasps for the one or more candidate object trajectories based on the current grasp, generating one or more grasps to be optimized for each waypoint of each of the candidate object trajectories based on the sampled candidate grasps, and optimizing one or more of the grasps to be optimized for each of the one or more candidate object trajectories based on a cost function.

The cost function may be defined a learned by the system and may include a task specific cost and a grasp specific cost. The task specific cost may be derived based on the associated task to be done, and may be associated with a torque force applied to the object. The grasp specific cost may be indicative of how well a proposed grasp is able to realize a pose for the object and resist external wrench force due to gravity. In other words, the grasp specific cost may be indicative of how stable the proposed grasp may be.

The cost function may include a term for evaluating stability of one or more of the grasps to be optimized. The cost function may include a term for mitigating collisions between two or more fingers of the robotic hand and the object. The cost function may include a term indicative of a signed distance field (SDF) of the object. The SDF of the object may be minimized at zero when contact points of two or more fingers of the robotic hand may be on a surface of the object. The cost function may include an energy based model, a wrench cost, a collision cost, or an inverse kinematics cost.

According to one aspect, a computer-implemented method for grasp selection may include receiving one or more candidate object trajectories and a current grasp of a robotic hand on an object, sampling random candidate grasps for the one or more candidate object trajectories based on the current grasp, generating one or more grasps to be optimized for each of the one or more candidate object trajectories based on the sampled candidate grasps, and optimizing one or more of the grasps to be optimized for each of the one or more candidate object trajectories based on a cost function.

The computer-implemented method for grasp selection may include selecting an optimized grasp from among the one or more grasps to be optimized associated with each of the one or more candidate object trajectories or generating one or more of the grasps to be optimized for each waypoint of each candidate object trajectory based on the sampled candidate grasps. Each one of the one or more candidate object trajectories may include two or more waypoints.

BRIEF DESCRIPTION OF THE DRAWINGS

FIG. 3 is an exemplary flow diagram of a computer-implemented method for grasp selection, according to one aspect.

DETAILED DESCRIPTION

Figure 1:
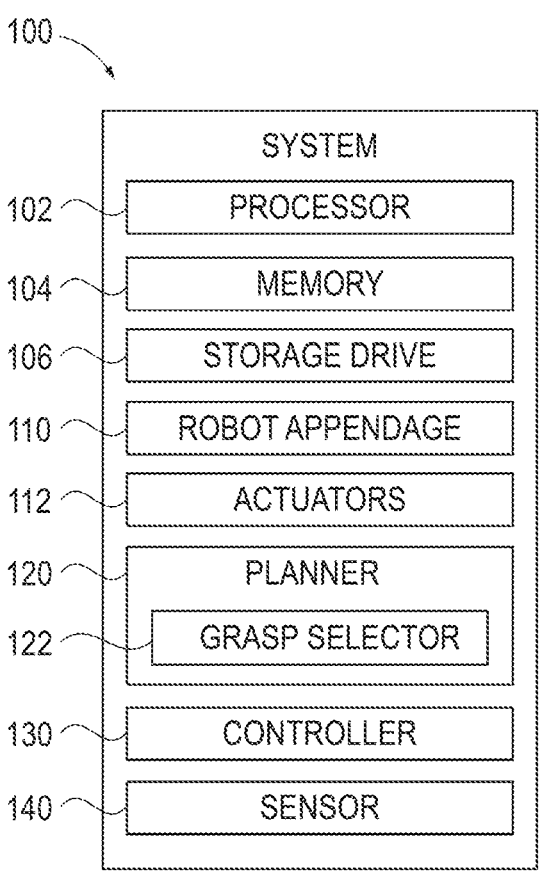
FIG. 1 is an exemplary component diagram of a system for grasp selection, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Generally described, a new grasp selection method is provided. This method may use optimization of learned cost models and a signed-distance function (SDF) of the object to select contact points on the object. Previous methods may use a finite number of manually specified contact points which may lie arbitrarily on the object surface. In addition, and as disclosed herein, an online iterative re-planning method is provided which plans a sequence of object poses and grasps for dexterous in-hand manipulation. The existing methods typically did not use feedback from the actual achieved grasps. By incorporating feedback, the method may achieve improved robustness and failure recovery. The proposed planning method may be extendable to the case where there is parametric uncertainty in object parameters for improved robustness.

Controlling a multi-fingered hand to manipulate a tool is provided. The goal may be to move the tool from a start pose to a goal pose. Once at the goal pose, the tool may be grasped such that the multi-fingered hand may apply a task wrench. The higher-level planner may select a sequence of object poses and grasps. Grasps may be specified by contact locations on the surface of the object for each finger that is in contact. This means that the grasp may be parameterized by both continuous and discrete variables (the contact locations and the fingers that are in contact). In addition, the sequence of object poses and grasps should be feasible, i.e. it must be able to move from one object pose to the next and from one grasp to the next while keeping hold of the object. Once such a trajectory has been chosen, existing algorithms may track this trajectory using lower-level controllers.

A method for online re-planning of trajectory is provided for in-hand manipulation of tools. At each timestep, the planner may receive the current grasp and object pose and generates a plan for the remainder of the trajectory. After generating this trajectory, lower level controllers may be used to transition towards the next sequence in the plan. After this, the actual achieved pose and grasp are used as input to the planner for the next iteration. Trajectory optimization may be used to plan which requires a trajectory cost. In particular the planner may incorporate a novel grasp selection using sampling and gradient based optimization. This grasp selection may optimize a general grasp quality cost as well as a task-specific cost. This grasp selection may be used for tasks other than in-hand manipulation by choosing an appropriate task-specific cost. Due to the hybrid discrete and continuous trajectory, optimization is not easily performed via gradient based methods only. Therefore, a combination of gradient-based methods and sample-based methods to perform the grasp selection may be used. Existing cost functions used for planning are typically not easily parallelizable or differentiable. Learned neural network cost models may therefore be used to approximate these existing cost functions.

FIG. 1 is an exemplary component diagram of a system 100 for grasp selection, according to one aspect. The system 100 for grasp selection may be utilized to control a multi-fingered robotic hand to manipulate a tool, such as by moving the tool from a start pose $o_1$ to a goal pose $o_G$. Once at $o_G$, the tool may be grasped such that the multi-fingered hand may apply a task wrench $w_G$. A planner, which may be higher-level, may select a sequence of T object poses and grasps. Grasps may be specified by contact locations $(c_i)$ on the surface of the object for each finger of the robotic hand that may be in contact with the object. This means that the grasp may be parameterized by both continuous and discrete variables (e.g., the contact locations and the fingers that may be in contact). A trajectory may be thus defined as $\tau = (o_1, c_1, o_0, \ldots o_T, c_T)$. In this regard, the objective may be to choose $\tau$ such that $o_G = o_T$ and that $w_G$ may be inside the wrench cone of the grasp $c_T$. In addition, the sequence of object poses and grasps may be feasible, i.e., able to move from one object pose to the next and from one grasp to the next while maintaining hold of the object. Once such a trajectory has been chosen, algorithms to track this trajectory using lower-level controllers may be implemented.

The system for system 100 for grasp selection may include a processor 102, a memory 104, a storage drive 106, a robot appendage 110 (e.g., robotic hand), one or more actuators 112, a planner 120, a grasp selector 122, a controller 130, and one or more sensors 140. The sensors 140 may be or may include optical sensors, image capture devices, force sensors, pressure sensors, capacitive sensors, proximity sensors, etc. The sensors may receive, provide, sense, and/or detect information associated with the system, an associated robot, a grasped object, an operating environment, and/or any operational systems associated therewith. For example, the processor 102 may receive data, raw sensor data, image data, depth data, tactile data, etc. from the sensors 140.

The sensor data may include information about a force sensor, such as the relative position of the force sensor relative to a reference point as measured by a sensor. The reference point may be an optical sensor. Depth data may include distance measurements from an optical sensor to a force sensor. Likewise, the tactile data may include dimensions (e.g., width, height, length, etc.) of the force sensor. The force censor may measure various forces exerted by (e.g., torque) or experienced by (e.g., resistance) the system. In any event, it is understood that the sensors may be any type of sensor, for example, acoustic, electric, environmental, optical, imaging, light, pressure, force, thermal, temperature, proximity, gyroscope, and accelerometers, among others.

The system may also be operably connected for computer communication (e.g., via a bus and/or a communication interface) to one or more operational systems. The operational systems may include, but are not limited to, any automatic or manual systems that may be used to enhance the system and/or associated operation. The operational systems may be dependent on the implementation.

The system and/or operational systems may be operatively connected for computer communication to a network. The network may be, for example, a data network, the Internet, a wide area network (WAN) or a local area (LAN) network. The network serves as a communication medium to various remote devices (e.g., databases, web servers, remote servers, application servers, intermediary servers, client machines, other portable devices). Detailed embodiments describing exemplary methods using the system and network configuration discussed above for online iterative re-planning will now be discussed in detail.

The memory 104 may store one or more instructions. The processor 102 may execute one or more of the instructions stored on the memory 104 to perform one or more acts, actions, steps, etc. The components of the system, as well as the components of other systems, hardware architectures, and software architectures discussed herein, may be combined, omitted, or organized into different architectures for various embodiments and may be implemented with a device or remotely stored.

The system may be implemented as a part of an agent. The agent may be bipedal, two-wheeled, four-wheeled robot, vehicle, or self-propelled machine. The autonomous agent may be configured as a humanoid robot. The humanoid robot may take the form of all or a portion of a robot. For example, the humanoid robot may take the form of an arm with fingers. The system may be implemented as part of a telematics unit, a head unit, a navigation unit, an infotainment unit, an electronic control unit, among others of an agent. In other embodiments, the components and functions of the system may be implemented, for example, with other devices (e.g., a portable device) or another device connected via a network. The system may be capable of providing wired or wireless computer communications utilizing various protocols to send/receive electronic signals internally to/from components of the operating environment. Additionally, the system may be operably connected for internal computer communication via a bus (e.g., a Controller Area Network (CAN) or a Local Interconnect Network (LIN)

protocol bus) to facilitate data input and output between the system and the components of the operating environment.

For example, the processor 102 may receive one or more candidate object trajectories and a current grasp of a robotic hand on an object. Each one of the one or more candidate object trajectories may include two or more waypoints.

The processor 102 may sample random candidate grasps for the one or more candidate object trajectories based on the current grasp.

The processor 102 may generate one or more grasps to be optimized for each of the one or more candidate object trajectories based on the sampled candidate grasps. According to one aspect, the processor 102 may generate one or more of the grasps to be optimized for each waypoint of each candidate object trajectory based on the sampled candidate grasps.

The processor 102 may optimize one or more of the grasps to be optimized for each of the one or more candidate object trajectories based on a cost function, which will be described in greater detail herein.

Figure 2:
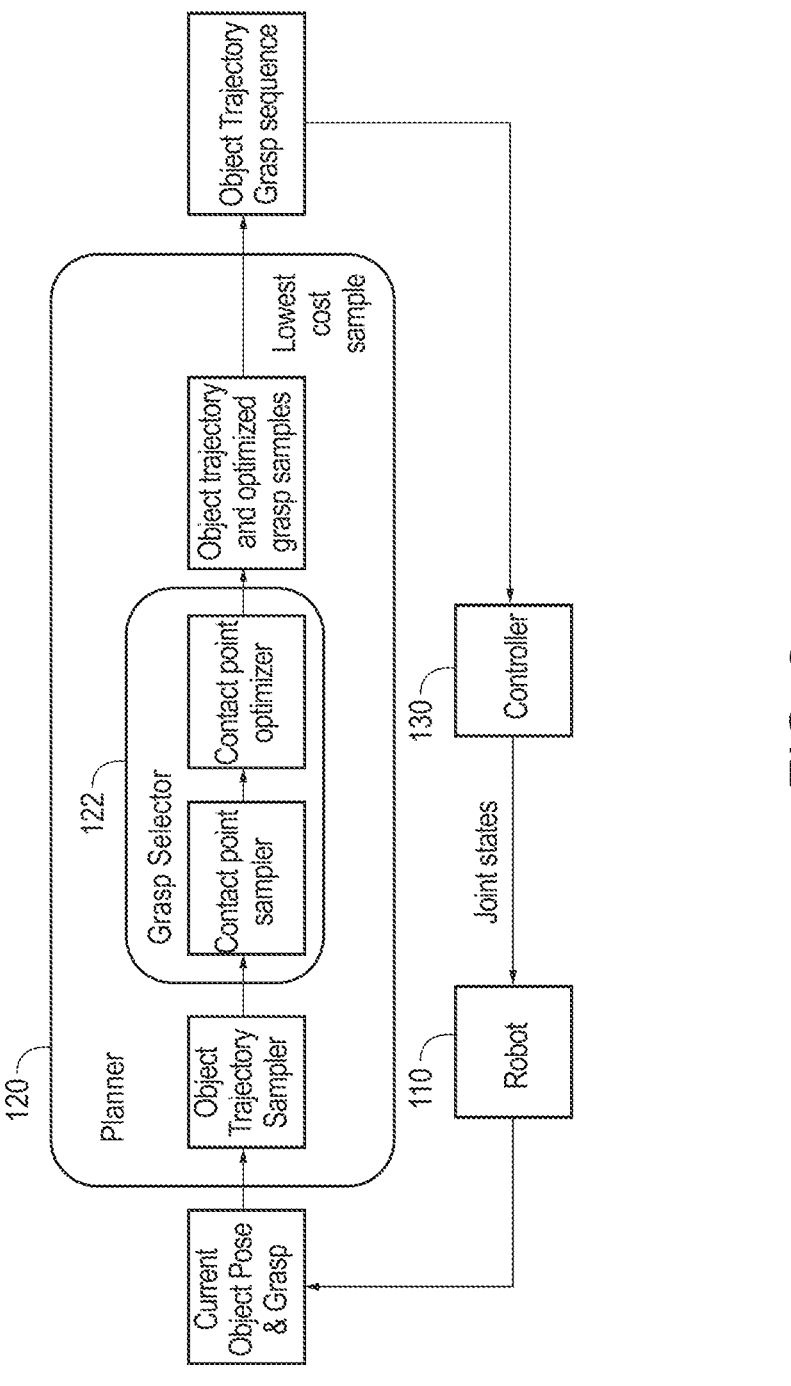
FIG. 2 is an exemplary component diagram of a system for grasp selection, according to one aspect.

FIG. 2 is an exemplary component diagram of a system 100 for grasp selection, according to one aspect. According to one aspect, a method for online re-planning of trajectory $\tau$ for in-hand manipulation of tools. At each timestep, a planner receives the current grasp and object pose $c_t$, $o_t$ and generates a plan for the remainder of the trajectory $\tau_t = (o_{t+1}, c_{t+1}, \ldots, o_T, c_T)$. After generating this trajectory, the lower level controllers may be used to transition from $(o_t, c_t)$ towards the next sequence in the plan $(o_{t+1}, c_{t+1})$. After this, the actual achieved pose and grasp may be used as an input to the planner 120 for the next iteration.

The system may use trajectory optimization to plan $\tau_t$, which may have a trajectory cost $J(\tau)$. In particular, the planner 120 may incorporate a novel grasp selector 122, described in greater detail herein, using sampling (e.g., random sampling) and gradient based optimization. This grasp selector 122 may optimize a grasp specific cost or a general grasp quality cost $L_{grasp}$ as well as a task-specific cost $L_{task}$. The grasp selector 122 may be used for tasks other than in-hand manipulation by choosing an appropriate task-specific cost.

Due to the hybrid discrete and continuous nature of $c_t$, trajectory optimization may not easily be performed utilizing gradient based methods. Therefore, a combination of gradient-based methods and sample-based methods may be implemented via the grasp selector 122 to perform the grasp selection. Some cost functions used for planning may be not be easily parallelizable or differentiable. Therefore, the system may use one or more learned neural network cost models to approximate these cost functions.

Grasp selection may optimize a general grasp quality cost as well as a task-specific cost. This grasp selection may be used for tasks other than in-hand manipulation by choosing an appropriate task-specific cost. Due to the hybrid discrete and continuous trajectory, optimization is not easily performed via gradient based methods only. Therefore, a combination of gradient-based methods and sample-based methods to perform the grasp selection may be used. Existing cost functions used for planning are typically not easily parallelizable or differentiable. Learned neural network cost models may therefore be used to approximate these existing cost functions.

Learned Cost Model

According to one aspect, the learned cost model J and sampling procedure may encapsulate and/or include:

The task wrench $w_G$ may be in the wrench cone of grasp $c_T$;

The final tool pose $o_T$ may equal the goal pose $o_G$;

The grasp sequence $c_t$, $c_{t+1}$ may be feasible;

The object pose sequence $o_t$, $o_{t+1}$ may be feasible; and

The contact points $c_t$ may lie on the surface of the object.

Learned Cost Functions

The cost function may include a term for evaluating stability of one or more of the grasps to be optimized. The cost function may include a term for mitigating collisions between two or more fingers of the robotic hand and the object.

According to one aspect, the form for the cost function may be:

$$J(T_\tau) = L_{task} + L_{grasp} \tag{1}$$

The task cost for this in-hand manipulation task may be a cost associated with how well the final wrench W G may be applied at the final grasp and object pose.

$$L_{task} = L_{wrench}(c_T, o_T, W_G) \tag{2}$$

$$L_{grasp} = \Sigma_t^{T-1} L_{wrench}(c_{K+1}, O_k, w_{mg}) + \Sigma_{t+1}^{T} L_{wrench}(c_{k+1}, o_k, w_{mg}) + \Sigma_t^{T-1}(L_{collision}(c_k, c_{k+1}) + L_{ik}(c_k) + |\phi(c_k)|) \tag{3}$$

The first two terms (e.g., $\Sigma_t^{T-1} L_{wrench}(c_{k+1}, o_k, w_{mg}) + \Sigma_{t+1}^{T} L_{wrench}(c_k o_k, w_{mg})$) of the grasp cost $L_{grasp}$ evaluate how the sequence of grasps may be able to resist the external wrench due to gravity $w_m g$. Stated another way, the first two terms (e.g., $\Sigma_t^{T-1} L_{wrench}(c_{k+1}, o_k, w_{mg}) + \Sigma_{t+1}^{T} L_{wrench}(c_k o_k, w_{mg})$) of the grasp cost $L_{grasp}$ may be indicative of whether the proposed or candidate grasps are stable.

The third term (e.g., $\Sigma_t^{T-1}(L_{collision}(c_k, c_{k+1}) + L_{ik}(c_k) + |\phi(c_k)|)$) may act to mitigate grasp sequences from involving unintended collisions between the fingers of the robotic hand and the object. $L_{ik}(c_k)$ may be a cost on Inverse Kinematics (IK) feasibility. Stated another way, the end fingers of the robotic hand may be able to reach the desired contact points without self-collision.

The final term (e.g., $|\phi(c_k)|$) may be the absolute value of the object SDF, and may be minimized at zero when contact points are on the surface of the object.

Object Signed Distance Field (SDF)

The cost function may include a term indicative of a signed distance field (SDF) of the object. The SDF of the object may be minimized at zero when contact points of two or more fingers of the robotic hand are on the surface of the object.

An SDF function $\phi(x): \mathbb{R}^3 \rightarrow \mathbb{R}$, which maps a point in space to the distance to the nearest surface of an object. The level set $\phi(x)=0$ implicitly defines the surface of the object. It may be computed offline and stored in a voxel-grid, but a neural network may be utilized to learn the function. This provides the advantages of arbitrary resolution and differentiability.

DeepSDF models have been learned using data generated from a mesh of the object. It may be possible to learn SDF models directly from point cloud observations. The method for grasp selection may be suitable for any neural network based SDF model. Data generated from a mesh of the objects may be utilized, but this may be changed to point cloud data to integrate with perception.

Using a learned SDF enables the system to find the contact normal at the surface as the gradient $n = \nabla_x \phi(x)$ and compute it via back-propagation through the learned model. The contact normal may be used as an input to the wrench cost. Therefore, another advantage or benefit may be that the system may compute the gradient of the contact normal with respect to the contact point as the second derivative $\nabla_x n = \nabla_x^2 \phi(x)$.

Energy Based Model (EBM)

An Energy Based Model (EBM) may be a model used to represent a learned cost function. EBMs may be generative models that learn unnormalized density $$p_\theta(x) \propto \exp(-E_\theta(x)) \tag{4}$$

$E_\theta$ may be a neural network with parameters $\theta$. Contrastive divergence may be utilized to train the EBMs while minimizing the following objective:

$$\mathcal{L} = \mathbb{E}_D(-E_\theta(x)) - \mathbb{E}_{p\theta}(-E_\theta(x)) \tag{5}$$

The first expectation may be with regard to the data (i.e., positive examples), and the second expectation may be with respect to samples generated from the model (negative examples). These may be generated via Langevin dynamics with the energy function. Thus, the system may minimize the energy of positive examples while maximizing the energy of negative examples. EBMs may be used for trajectory optimization where they have been trained on expert demonstrations, and used as an auxiliary cost.

Wrench Cost

The cost function may include a wrench cost. According to one aspect, wench cost may be found by optimizing the contact point locations to be able to resist external wrench. Given a desired wrench $w=(f_{total}, \tau_{total})$ and grasp c, the following optimization may be performed:

$$w^* = \frac{\arg\min}{f_1, \ldots, f_K} = \left\| f_{total} - \sum_k^K f_k \right\|^2 + \| \tau_{total} - p_k \times f_k \|^2 \tag{6}$$
$$\text{s.t. } A_k f_k \le 0$$

The $p_k$ vector may be from the object center of mass to the contact point.

$A_k f_k$ may be the contact force and the linearized friction cone for the kth finger. Both $p_k$ and $A_k$ may be functions of the contact points of the grasp, and the contact normal which may be a function of the geometry of the object and the grasp contact point. If it is desired to resist an external wrench $w_{ext}$, then the desired wrench may be set to $-w_{ext}$ and the wrench error may be $\|w_{ext}+w'\|^2$. The forces may be vectors and may be in the frame of reference of the object.

This cost may be a quadratic program and thus may be optimized relatively quickly. However, for the combined sample-based and gradient-based trajectory optimization the system may evaluate this cost in parallel and differentiate through the cost. According to one aspect, a system may utilize differentiable quadratic programs. According to another aspect, the system may learn an approximation to this cost with the above discussed EBMs.

To achieve learning the approximation to these costs using EBMs, a large dataset of grasps $c_k$, contact normals $n_k$, and desired wrenches $w_d$ in the object frame may be generated. Contact force optimization may be performed for each element of this dataset to generate error labels $e=\|w_d - w'\|^2$. The error may be thresholded to generate positive and negative examples for the data $(c_1, n_1, \ldots, c_K, n_K, \ldots, w_d)$. The energy based model may be parameterized as a neural network with multiple layers and ReLU activations. An energy based model may be trained with cost defined in Equation (5). In addition to this cost, the energy of the negative examples may be maximized. In this way, the resulting EBM may have low energy for low-error force optimizations, and high energy for both high-error force optimizations, as well as data that may be outside the training distribution. To evaluate the wrench cost for a grasp and object pose, the external wrench may be transformed to the object frame with the object pose, the contact normal computed at the grasp using the object SDF, and the EBM evaluated.

Collision Cost

The cost function may include a collision cost. To compute the collision cost between a finger of the robotic hand and the object when moving between contact points, the system may generate waypoints from the current end-effector position to the contact point and check the signed distance at each waypoint using $\phi$. Since the waypoint locations may be a linear function of $c_k$ and $c_{k+1}$, the system may compute the derivate of this collision cost with respect to the contact points using $\nabla_x \phi(x)$.

Inverse Kinematics Cost

The cost function may include an inverse kinematics cost. Inverse kinematics may be computed in closed form, but the system may learn it too for the same reasons as the wrench cost. A large dataset of joint configurations for the hand may be generated. Forward kinematics for the joint configurations may be performed to generate end effector locations. Each of these joint configurations may be collision checked. The data may be separated into a positive collision-free valid end-effector positions and negative in-collision end-effector positions. The same method as the wrench cost may be utilized to train an EBM on this dataset, using contrastive divergence to minimize the energy of positive example, while maximizing the energy of negative examples and artificially generated negative examples from the model.

For a given object pose and initial grasp, multiple object trajectories may be sampled. Then, for each object trajectory, grasp selection may be performed. The lowest cost trajectory may be selected and executed for the first pose and grasp change. Execution and tracking may be performed with the controller 130. The grasp selector 122 may use optimization of learned cost models and a signed-distance function (SDF) of the object to select contact points on the object. Unlike other methods, which use a finite number of manually specified contact points, these contact points may lie arbitrarily on the object surface.

To perform grasp selection, the grasp selector 122 may select which fingers may be in contact as well as the contact locations. This mix of discrete and continuous decision variables may make continuous optimization difficult. In this regard, the grasp selector 122 may perform grasp selection by randomly sampling the fingers in contact, and then performing continuous optimization of the contact points.

As seen in FIG. 2, the grasp selector 122 may include a contact point sampler and a contact point optimizer. The grasp selector 122 and the controller 130 may include an artificial neural network that act as a framework for machine learning, including deep learning. For example, the grasp selector 122 and the controller 130 may include a convolution neural network (CNN), a concatenator, a deep neural network (DNN), a recurrent neural network (RNN), a 3D Convolutional Neural Network (3D-CNN), a Convolutional Long-Short Term Memory (ConvLSTM), a Long-Short Term Memory (LSTM), one or more layers, such as a fully-connected layer, etc.

According to one aspect, the contact point sampler of the grasp sector may receive one or more candidate waypoint object trajectories and a current grasp. The candidate waypoint object trajectories may be potential object trajectories which each include a set of waypoints. The current grasp may include current grasp information associated with the robotic hand, fingers thereof, and an object (e.g., to be grasped or already grasped). The contact point sampler may sample random candidate grasps based on the current grasp associated with the robotic hand and generate a grasp to be optimized for each waypoint of each candidate waypoint object trajectory.

In other words, each candidate waypoint object trajectory may have its own set of grasps to be optimized. For example, if there are ten candidate waypoint object trajectories, and each candidate waypoint object trajectory has three waypoints, a total of thirty grasps may be optimized by the grasp selector 122.

The contact point sampler may constrain the sampled contact sequence by assuming that between grasp $c_k$ and $c_{k+1}$ a finger may be removed from contact, or added to contact at a new contact location. According to one aspect, it may be assumed that multiple fingers are not be added or removed at the same time, and fingers may not change directly from one contact location to another without being removed first, thereby simplifying the contact sequence for the lower-level controllers. The contact point sampler may represent the contact sequence as $(c_t, \Delta_{c_{t+1}}, \ldots, \Delta_{c_T})$, which may be the current grasp and a sequence of grasp changes. Each grasp may be change $\Delta_{c_k}=(i, c)_k$ parameterized by an integer representing which robot finger (if any) to change, and contact points. If the ith finger at the previous grasp is in contact, then this change removes it from contact and the contact point may be ignored. If the ith finger is currently in contact, then it may be added to contact at contact location c. The grasp sequence may be initialized to be a sequence of null changes. When sampling, the contact point sampler may use the current nominal grasp sequence. For each timestep with some probability the contact point sampler may re-sample a contact finger i and a new contact point c. These contact points may be sampled from a zero mean Gaussian and so will not be on the surface of the object initially. Thus, the contact point sampler may sample $\Delta_{c_{t+1:T}}$, and then compute $c_{t+1:T}$ from $\Delta_{c_{t+1:T}}$ and $c_t$.

Once the contact point optimizer has sampled an initial $c_{t:T}$, as well as the object trajectories from the previous section $o_{t:T}$, the contact point optimizer may perform optimization of the contact points via the learned cost function $J_\tau$. The contact point optimizer may use gradient descent to minimize this loss function for each sample using $\nabla_\tau J_\tau$. Since moving contact points in the contact sequence begins with removing a finger, the contact point optimizer may optimize the contact points for a finger that has just been added to contact. While $J_\tau$ includes a cost which encourages the contact points to be on the surface of the object, they may sometimes deviate from the surface. To avoid this, the contact point optimizer may use projected gradient descent, where the contact point optimizer may iterate between optimizing $J_\tau$ and minimizing $|\phi(c)|$ to project the contact points onto the surface of the object.

Once the grasp selector 122 has performed grasp selection, a number of samples of $(o_{1:T}, c_{1:T})$ may be found. The grasp selector 122 may select the trajectory having the lowest cost for execution. In this way, the processor 102 may select an optimized grasp from among the one or more grasps to be optimized associated with each of the one or more candidate object trajectories.

FIG. 3 is an exemplary flow diagram of a computer-implemented method 300 for grasp selection, according to one aspect. According to one aspect, the computer-implemented method 300 for grasp selection may include receiving 302 one or more candidate object trajectories and a current grasp of a robotic hand on an object, sampling 304 random candidate grasps for the one or more candidate object trajectories based on the current grasp, generating 306 one or more grasps to be optimized for each of the one or more candidate object trajectories based on the sampled candidate grasps, and optimizing 308 one or more of the grasps to be optimized for each of the one or more candidate object trajectories based on a cost function.

Figure 4:
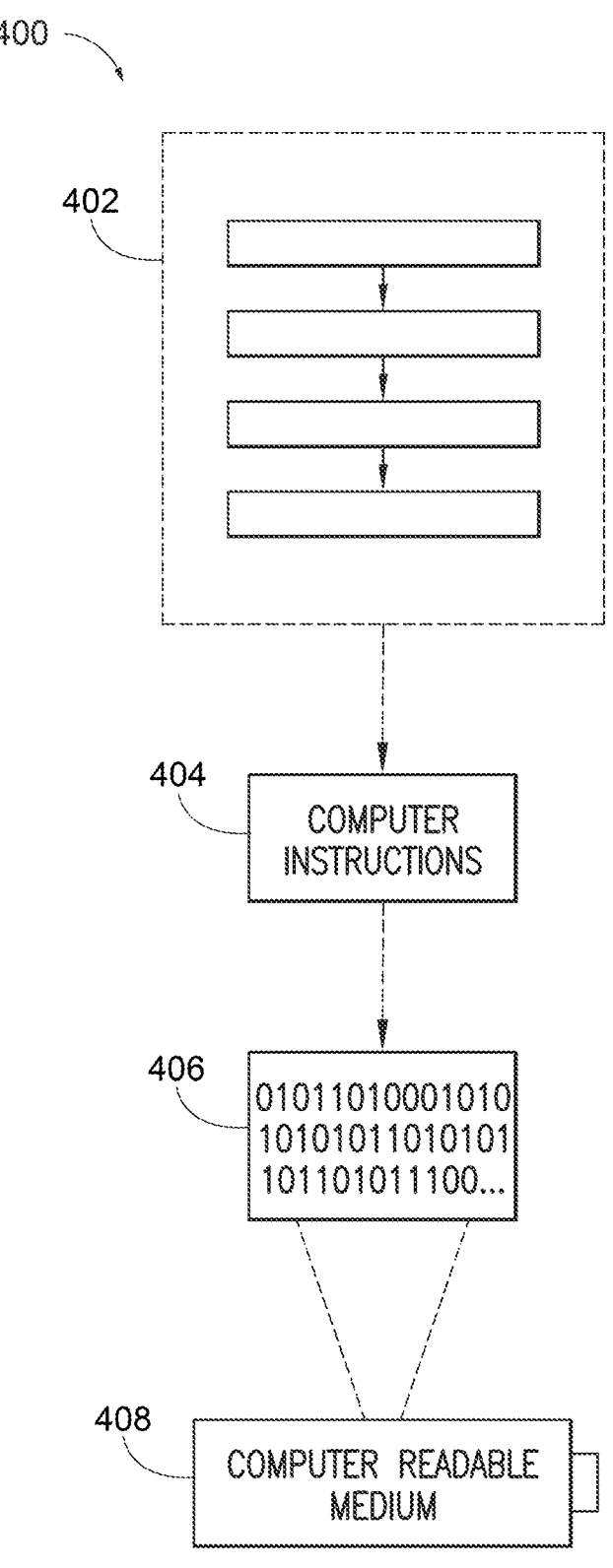
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the computer-implemented method 300 of FIG. 3. In another aspect, the processor-executable computer instructions 404 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
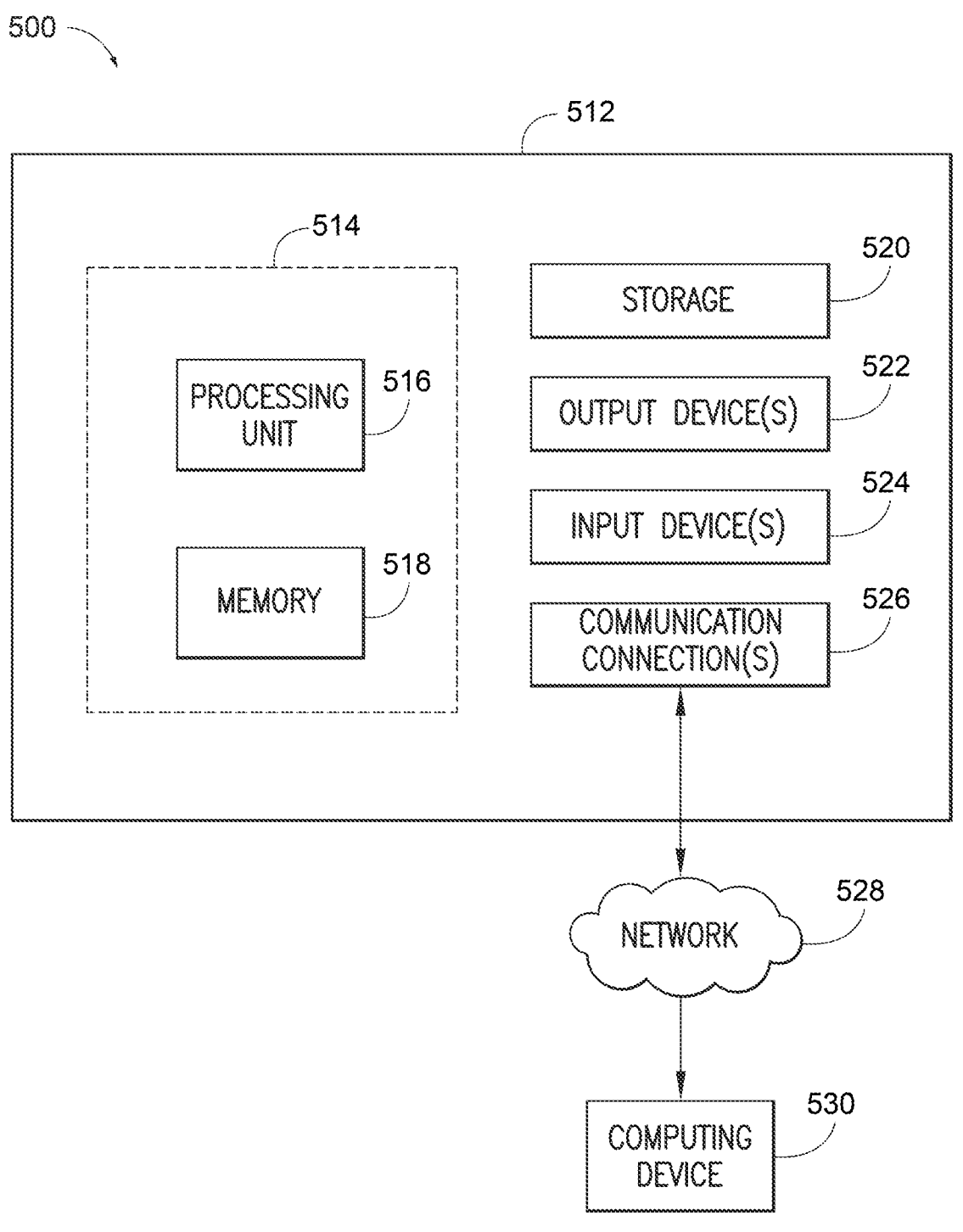
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the computing device 512 includes additional features or functionality. For example, the computing device 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by the at least one processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for grasp selection, comprising:
a memory storing one or more instructions; and
a processor executing one or more of the instructions stored on the memory to perform:
receiving one or more candidate object trajectories and a current grasp of a robotic hand on an object;
sampling random candidate grasps for the one or more candidate object trajectories based on the current grasp of the robotic hand;
generating one or more grasps to be optimized for each of the one or more candidate object trajectories based on the sampled candidate grasps; and
optimizing one or more of the grasps to be optimized for each of the one or more candidate object trajectories based on a neural network cost function of a combination of a grasp quality cost and a task-specific cost by using gradient descent to minimize the neural network cost function.

2. The system for grasp selection of claim 1, wherein the processor selects an optimized grasp from among the one or more grasps to be optimized associated with each of the one or more candidate object trajectories.

3. The system for grasp selection of claim 2, wherein the processor generates one or more of the grasps to be optimized for each waypoint of each candidate object trajectory based on the sampled candidate grasps.

4. The system for grasp selection of claim 1, wherein each one of the one or more candidate object trajectories includes two or more waypoints.

5. The system for grasp selection of claim 1, wherein the neural network cost function includes a term for evaluating stability of one or more of the grasps to be optimized.

6. The system for grasp selection of claim 1, wherein the neural network cost function includes a term for mitigating collisions between two or more fingers of the robotic hand and the object.

7. The system for grasp selection of claim 1, wherein the neural network cost function includes a term indicative of a signed distance field (SDF) of the object.

8. The system for grasp selection of claim 7, wherein the SDF of the object is minimized at zero when contact points of two or more fingers of the robotic hand are on a surface of the object.

9. The system for grasp selection of claim 1, wherein the neural network cost function includes an energy based model.

10. The system for grasp selection of claim 1, wherein the neural network cost function includes a wrench cost, a collision cost, or an inverse kinematics cost.

11. A system for grasp selection, comprising:
a memory storing one or more instructions; and
a processor executing one or more of the instructions stored on the memory to perform:
receiving one or more candidate object trajectories and a current grasp of a robotic hand on an object, wherein each one of the one or more candidate object trajectories includes two or more waypoints;
sampling random candidate grasps for the one or more candidate object trajectories based on the current grasp of the robotic hand;
generating one or more grasps to be optimized for each waypoint of each of the candidate object trajectories based on the sampled candidate grasps; and
optimizing one or more of the grasps to be optimized for each of the one or more candidate object trajectories based on a neural network cost function of a combination of a grasp quality cost and a task-specific cost by using gradient descent to minimize the neural network cost function.

12. The system for grasp selection of claim 11, wherein the neural network cost function includes a term for evaluating stability of one or more of the grasps to be optimized.

13. The system for grasp selection of claim 11, wherein the neural network cost function includes a term for mitigating collisions between two or more fingers of the robotic hand and the object.

14. The system for grasp selection of claim 11, wherein the neural network cost function includes a term indicative of a signed distance field (SDF) of the object.

15. The system for grasp selection of claim 14, wherein the SDF of the object is minimized at zero when contact points of two or more fingers of the robotic hand are on a surface of the object.

16. The system for grasp selection of claim 11, wherein the neural network cost function includes an energy based model, a wrench cost, a collision cost, or an inverse kinematics cost.

17. A computer-implemented method for grasp selection, comprising:
receiving one or more candidate object trajectories and a current grasp of a robotic hand on an object;
sampling random candidate grasps for the one or more candidate object trajectories based on the current grasp;
generating one or more grasps to be optimized for each of the one or more candidate object trajectories based on the sampled candidate grasps; and
optimizing one or more of the grasps to be optimized for each of the one or more candidate object trajectories based on a neural network cost function of a combination of a grasp quality cost and a task-specific cost by using gradient descent to minimize the neural network cost function.

18. The computer-implemented method for grasp selection of claim 17, comprising selecting an optimized grasp from among the one or more grasps to be optimized associated with each of the one or more candidate object trajectories.

19. The computer-implemented method for grasp selection of claim 17, wherein each one of the one or more candidate object trajectories includes two or more waypoints.

20. The computer-implemented method for grasp selection of claim 19, comprising generating one or more of the grasps to be optimized for each waypoint of each candidate object trajectory based on the sampled candidate grasps.

\* \* \* \* \*